(12) United States Patent
Deng et al.

(10) Patent No.: US 9,176,989 B2
(45) Date of Patent: *Nov. 3, 2015

(54) IMAGE QUALITY ANALYSIS FOR SEARCHES

(71) Applicant: Alibaba Group Holding Limited, George Town, KY (US)

(72) Inventors: Yu Deng, Beijing (CN); Ke Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,913

(22) Filed: Sep. 15, 2014

(65) Prior Publication Data

US 2015/0043810 A1 Feb. 12, 2015

Related U.S. Application Data

(63) Continuation of application No. 13/623,469, filed on Sep. 20, 2012, now Pat. No. 8,897,604.

(30) Foreign Application Priority Data

Sep. 23, 2011 (CN) .......................... 2011 1 0286895

(51) Int. Cl.
   *G06T 7/00* (2006.01)
   *G06F 17/30* (2006.01)

(52) U.S. Cl.
   CPC ...... *G06F 17/30256* (2013.01); *G06F 17/3025* (2013.01); *G06F 17/30259* (2013.01); *G06T 7/0002* (2013.01); *G06T 2207/20081* (2013.01); *G06T 2207/30168* (2013.01)

(58) Field of Classification Search
   None
   See application file for complete search history.

(56) References Cited

U.S. PATENT DOCUMENTS

| | | | |
|---|---|---|---|
| 6,282,317 B1 | 8/2001 | Luo et al. | |
| 6,473,522 B1 | 10/2002 | Lienhart et al. | |
| 6,816,847 B1 * | 11/2004 | Toyama | 706/14 |
| 6,839,466 B2 | 1/2005 | Venable | |

(Continued)

FOREIGN PATENT DOCUMENTS

JP    2008052672    3/2008

OTHER PUBLICATIONS

Deng, Yining, and B. S. Manjunath. "Unsupervised segmentation of color-texture regions in images and video." Pattern Analysis and Machine Intelligence, IEEE Transactions on 23.8 (2001): 800-810.*

(Continued)

*Primary Examiner* — Chan Park
*Assistant Examiner* — Geoffrey E Summers
(74) *Attorney, Agent, or Firm* — Van Pelt, Yi & James LLP

(57) ABSTRACT

Image analysis includes: determining, using one or more processors, an image quality score associated with an image, including: determining a foreground and a background in the image; calculating a set of one or more characteristic parameters of the image based on the determined foreground and background; calculating the image quality score based at least in part on the set of characteristic parameters, wherein calculating the image quality score comprises using an image quality computation model that has been pre-trained; and in response to a search query, generating a set of search results that includes a set the images, wherein inclusion of the images or ranking of the search results is based at least in part on image quality scores associated with the set of images.

14 Claims, 6 Drawing Sheets

(56) References Cited

U.S. PATENT DOCUMENTS

| | | | |
|---|---|---|---|
| 6,847,733 B2 * | 1/2005 | Savakis et al. | 382/225 |
| 6,965,684 B2 | 11/2005 | Chen et al. | |
| 8,311,364 B2 | 11/2012 | Cerosaletti et al. | |
| 8,576,242 B2 | 11/2013 | Kitago | |
| 8,611,615 B2 | 12/2013 | Yokokawa et al. | |
| 2008/0285092 A1 * | 11/2008 | Curtis | 358/474 |
| 2009/0052736 A1 | 2/2009 | Kacker | |

OTHER PUBLICATIONS

Huang, Chaobing, Quan Liu, and Shengsheng Yu. "Automatic central object extraction from color image." Information Engineering and Computer Science, 2009. ICIECS 2009. International Conference on. IEEE, 2009.*

Luo, Yiwen, and Xiaoou Tang. "Photo and video quality evaluation: Focusing on the subject." Computer Vision—ECCV 2008. Springer Berlin Heidelberg, 2008. 386-399.*

Marichal, Xavier, Wei-Ying Ma, and HongJiang Zhang. "Blur determination in the compressed domain using DCT information." Image Processing, 1999. ICIP 99. Proceedings. 1999 International Conference on. vol. 2. IEEE, 1999.*

Ming-Ming Cheng; Guo-Xin Zhang; Mitra, N.J.; Xiaolei Huang; Shi-Min Hu, "Global contrast based salient region detection," Computer Vision and Pattern Recognition (CVPR), 2011 IEEE Conference on , vol., No., pp. 409,416, Jun. 20-25, 2011.*

Takahiro Shabata, "Gold Silver and Bronze Awards for Tools 2010" Domestic Technology Journal 2009, pp. 31-33.

* cited by examiner

US 9,176,989 B2
IMAGE QUALITY ANALYSIS FOR SEARCHES

CROSS REFERENCE TO OTHER APPLICATIONS

This application is a continuation of co-pending U.S. patent application Ser. No. 13/623,469, entitled IMAGE QUALITY ANALYSIS FOR SEARCHES filed Sep. 20, 2012 which is incorporated herein by reference for all purposes, which claims priority to People's Republic of China Patent Application No. 201110286895.6 entitled A METHOD AND DEVICE FOR ANALYZING PICTURE QUALITY filed Sep. 23, 2011 which is incorporated herein by reference for all purposes.

FIELD OF THE INVENTION

The present application relates to image identification technology. In particular, it relates to a method and device for analyzing picture quality for filtering searches.

BACKGROUND OF THE INVENTION

As online shopping grows in popularity, an increasing number of merchants are using images to display their products. Product image quality influences the effectiveness of product information and whether a customer buys a product. The product images also have an effect on buying experience of a customer on the e-commerce website. Both the resolution of product images and the contrast between products and the image background can serve as factors in analyzing product image quality and for deciding the quality of product images.

With the development of social networks and other Web 2.0 platforms, users can more easily upload and display all kinds of photographs on networks, such as photographs of people, photographs of natural scenery, photographs of home furnishings, and so on. The quality of these photographic images will affect how other users perceive the images and react to the content associated with the images.

Systems that analyze image quality in the prior art generally are limited to analyzing the resolution of the image itself and typically do not conduct a comprehensive analysis of the image quality. In particular, many e-commerce platforms still rely on manual analysis and evaluation of product images.

BRIEF DESCRIPTION OF THE DRAWINGS

Various embodiments of the invention are disclosed in the following detailed description and the accompanying drawings.

DETAILED DESCRIPTION

Figure 1:
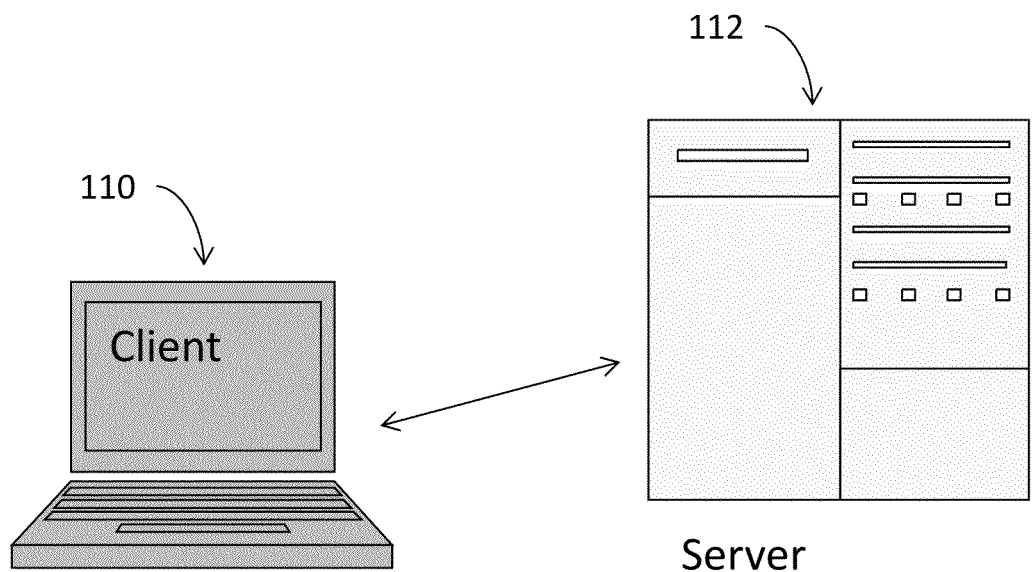
FIG. 1 is an illustration of an embodiment of the environment for a system for analyzing image quality for filtering searches.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of analyzing image quality for filtering searches is disclosed. An image is analyzed to determine the foreground and background. Characteristic parameters are extracted out of the image based on the determined foreground and background. In some embodiments, characteristic parameters include background complexity, mean gradient value, foreground-background contrast, sharpness, and target size. An image quality score is calculated based on the characteristic parameters using an image quality computation model. In some embodiments, the image quality computation model is a machine learning model that has been pre-trained. In some embodiments, the image quality computation model is a support-vector-machine. In some embodiments, an image quality score is generated from the image quality computation model.

In some embodiments, the image quality score is calculated for images that are to be searched. In some embodiments, a user enters a search query. Search results that include images are obtained. In some embodiments, the search results that include images are ranked or filtered according to the image quality score associated with the image. For example, a user searches for a product on an e-commerce website and the product search is filtered so that only products with product images of a certain quality are shown.

FIG. 1 is an illustration of an embodiment of the environment for a system for analyzing image quality for filtering searches. A user on client 110 uploads an image to server 112 (via a network such as the Internet or a private network.) In some embodiments, client 110 analyzes the quality of the image. In some embodiments, server 112 analyzes the quality of the image. In some embodiments, image quality is expressed as a score of the quality of the image depending on characteristics of the image.

In some embodiments, the user is a merchant selling products on a e-commerce website hosted on server 112 and the merchant is uploading images of products onto the website hosted on server 112. In some embodiments, the user on client 110 submits a query to server 112, and server 112 returns search results that include images. In some embodiments, the server ranks or filters the search results based on the image quality score of the image. In some embodiments, the user is a shopper on client 110 and looking for products being offered on the e-commerce website hosted by server 112. In some embodiments, the shopper submits a query to server 112 to search for a product, and server 112 returns search results including product images ranked or filtered by the image quality score of the product image. For example, the search engine on server 112 takes into account the image quality score when ranking the search results so merchants that upload better pictures onto the e-commerce website are promoted in the web search and a better searching experience is provided for buyers. Other applications of the image quality analysis can also be used.

In various embodiments, client 110 can be one or more of following: computer, laptop, mobile device such as smartphone, tablet, camera, scanner that is in communication with server 112, or other appropriate devices capable of obtaining and/or generating images. In some embodiments, client 110 is in communication with server 112 through the internet, LAN, WIFI, cellular data network (e.g. 3G or LTE or WiMax), or near-field communication, or any other suitable connection.

Figure 2:
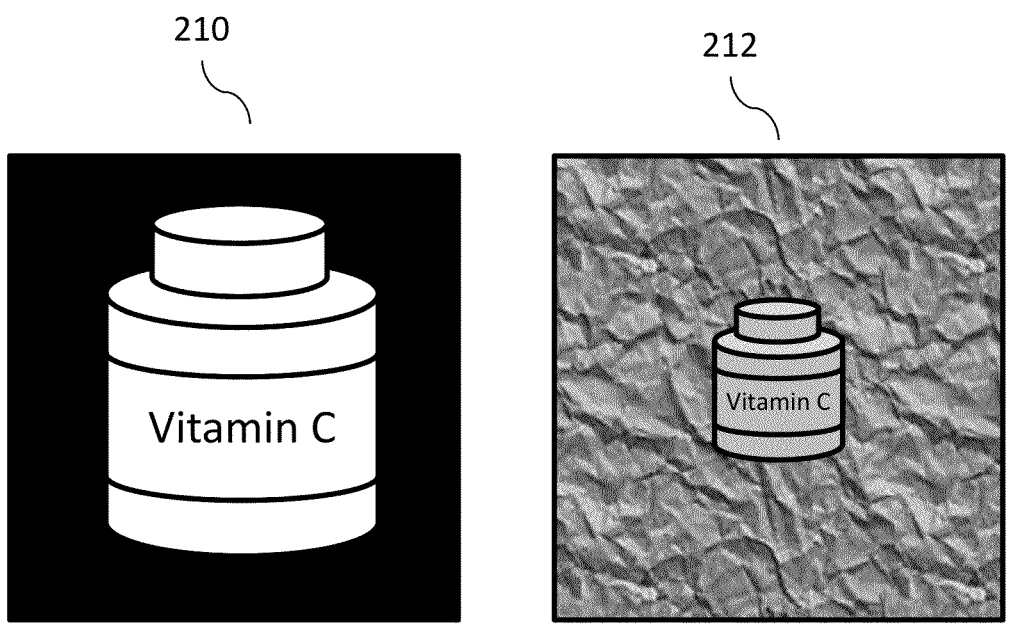
FIG. 2 is an illustration of exemplary images that are analyzed for image quality.

FIG. 2 is an illustration of exemplary images that are analyzed for image quality. Image 210 and image 212 show an example of images to be analyzed for image quality. Image 210 depicts a product, "Vitamin C" in a white bottle, in the foreground and a black background. Image 212 shows a bottle of "Vitamin C" in a gray bottle in the foreground on a gray textured background. In some embodiments, image 210 is deemed to have a higher image quality because of higher contrast between the foreground and the background and the larger size of the product in the picture, and image 212 is deemed to have lower image quality because of the texture and complexity of the background, low contrast between the background and the foreground, and the smaller size of the product compared to the size of the image.

Figure 3A:
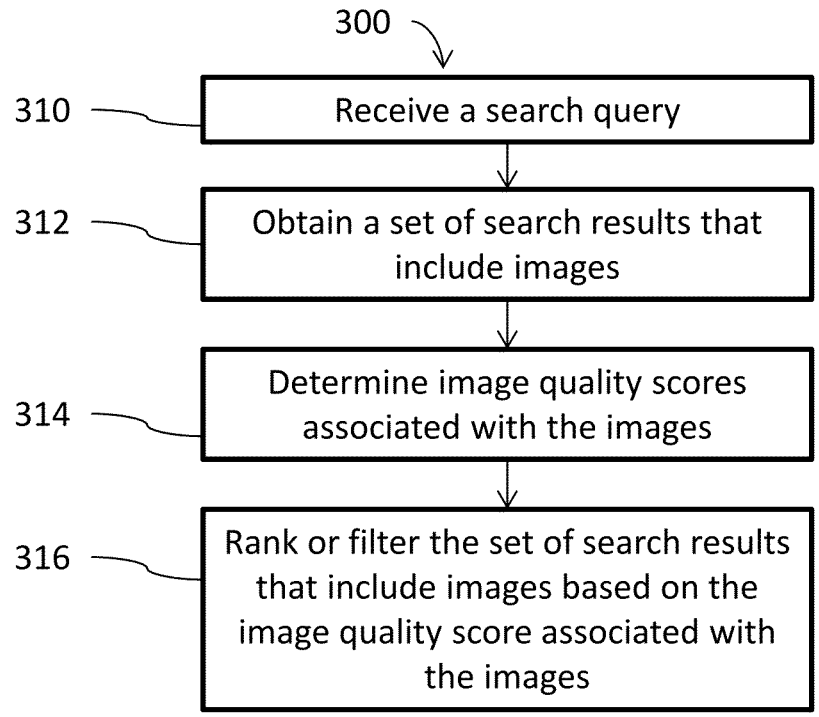
FIG. 3A is flowchart illustrating an embodiment of a method for analyzing image quality for filtering searches.

FIG. 3A is flowchart illustrating an embodiment of a method for analyzing image quality for filtering searches. At least a portion of 300 is performed by server 112 of FIG. 1. In some embodiments, a portion of 300 is performed by client 110 of FIG. 1.

At 310, a search query is received. In some embodiments, a user on a client enters a search query, which is received by the client and transmitted to the server. The server receives the search query. In some embodiments, the server receives the search query that is not made by a user (e.g. another search engine, server or web crawler).

At 312, a set of search results that include images is received. In some embodiments, the server that receives a search query also obtains a set of search results that include images.

At 314, image quality scores associated with the images is determined. In some embodiments, the server also obtains image quality scores that are associated with each search result that includes an image. In some embodiments, the image quality scores were previously calculated and stored with the image. Then when obtaining search results, the associated image quality score is also obtained. In some embodiments, the search result is an object in a database with an associated image and the image quality score is stored with the object. In some embodiments, when an image is uploaded to the server, an image quality score is calculated and associated with the image. For example, a merchant listing a product on an e-commerce website, uploads a picture of the product to the website and the image quality score is calculated at the time of upload. In some embodiments, a database of images is prepared for searching and an image quality score is calculated for each image and associated with the image. For example, the feature of ranking higher quality product images at the top is added to an e-commerce website searching tool, the product database including product information and product images is processed to include image quality scores.

In some embodiments, the server calculates the image quality score at the same time as obtaining the search results. In some embodiments, the server calculates the image quality scores ahead of time.

At 316, the set of search results that include images are ranked or filtered based on the image quality scores associated with the images. In some embodiments, the server ranks or filters the set of search results that include images using the image quality scores. In some embodiments, the client ranks or filters the set of search results that include images using the image quality scores.

In some embodiments, the inclusion of images in the search results is based on the image quality scores. For example, the set of search results are filtered based on the image quality score associated with each image, and any search results that have an image quality score less than a predetermined threshold are not shown or included in the list of search results displayed to the user.

Figure 3B:
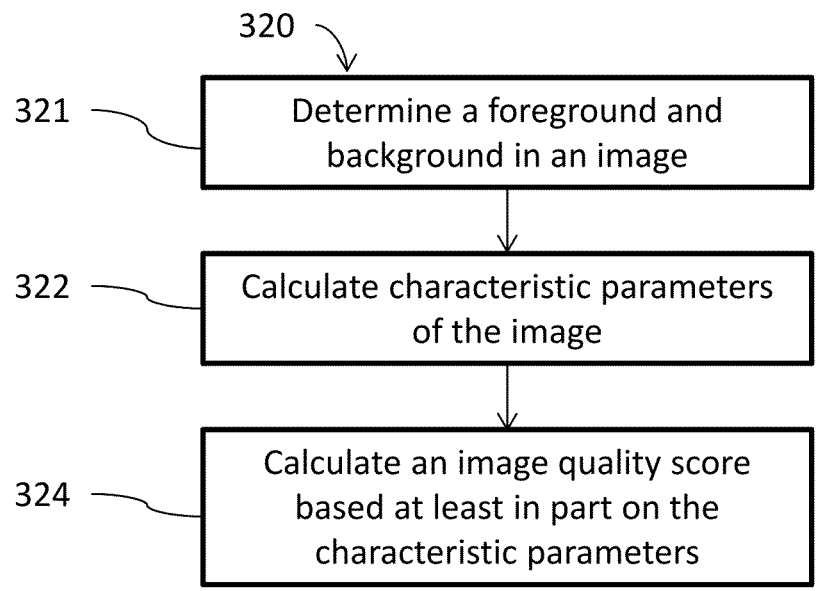
FIG. 3B is a flowchart illustrating an embodiment of calculating an image quality score for an image.

FIG. 3B is a flowchart illustrating an embodiment of calculating an image quality score for an image. In some embodiments, process 320 is used to implement 314 at the time of obtaining search results. In some embodiments, process 320 is performed when an image is preprocessed for searching. In some embodiments, an image is preprocessed for searching when the image is uploaded to a product database.

At 321, a foreground and background is determined in an image. The image is an image that is being analyzed for image quality. In some embodiments, the foreground includes an object. The background is the part of the image that does not include the foreground. For example, the foreground of a product image is the product and the background is the setting of product image (e.g. a backdrop of uniform color).

At 322, characteristic parameters of the image are determined. In some embodiments, the characteristic parameters include one or more of the following: background complexity, mean gradient value, foreground/background contrast, sharpness metric, and foreground size.

At 324, an image quality score is calculated based at least in part on the characteristic parameters. In some embodiments, the image quality score is calculated using an image quality computation model that has been pre-trained. In some embodiments, the image quality computation model is a support-vector-machine (SVM). A support-vector-machine is a type of machine learning model. In some embodiments, the SVM has been pre-trained using a set of training images.

In some embodiments, the image quality computation model has been pre-trained by selecting a set of training images and setting the outcome of the image quality computation model for each training image, such as the image quality score. Characteristic parameters are extracted from each of the training images and used as an input to the image quality computation model and the resulting image quality score is set according to a scale that is appropriate for the application, so that the image quality computation model is trained. Therefore when an image similar to the training image with similar characteristic parameters are inputted into the image quality computation model, the output of the image quality computation model is a similar image quality score to the predetermined image quality score of the training image. For example, a training image is selected of a bottle of shampoo that is large and has good contrast with its background is set to have a high score of 89. Another training image of a laptop computer has lower contrast and the image of the product is smaller, so the image of the laptop is set to have a score of 70. These images and other images are fed through the image quality computation model to train the image quality computation model. Therefore images that have similar characteristic parameters like the image of the bottle of shampoo will receive a similar score to 89, and images like the laptop picture will result in a lower score of 70. In some embodiments, the training images are selected and the image quality score for each training image is set by an image quality system administrator.

In some embodiments, the image quality score is on a scale of 0 to 100. In some embodiments, the image quality score is on a scale of 0 to 1. In some embodiments, the image quality score is set to a scale of 1 to 10. Any appropriate scale for the application of the image quality score can also be used. In some embodiments, the image quality score is calculated with the image quality computation model on a certain scale and then multiplied by a constant to obtain a different scale.

Figure 4:
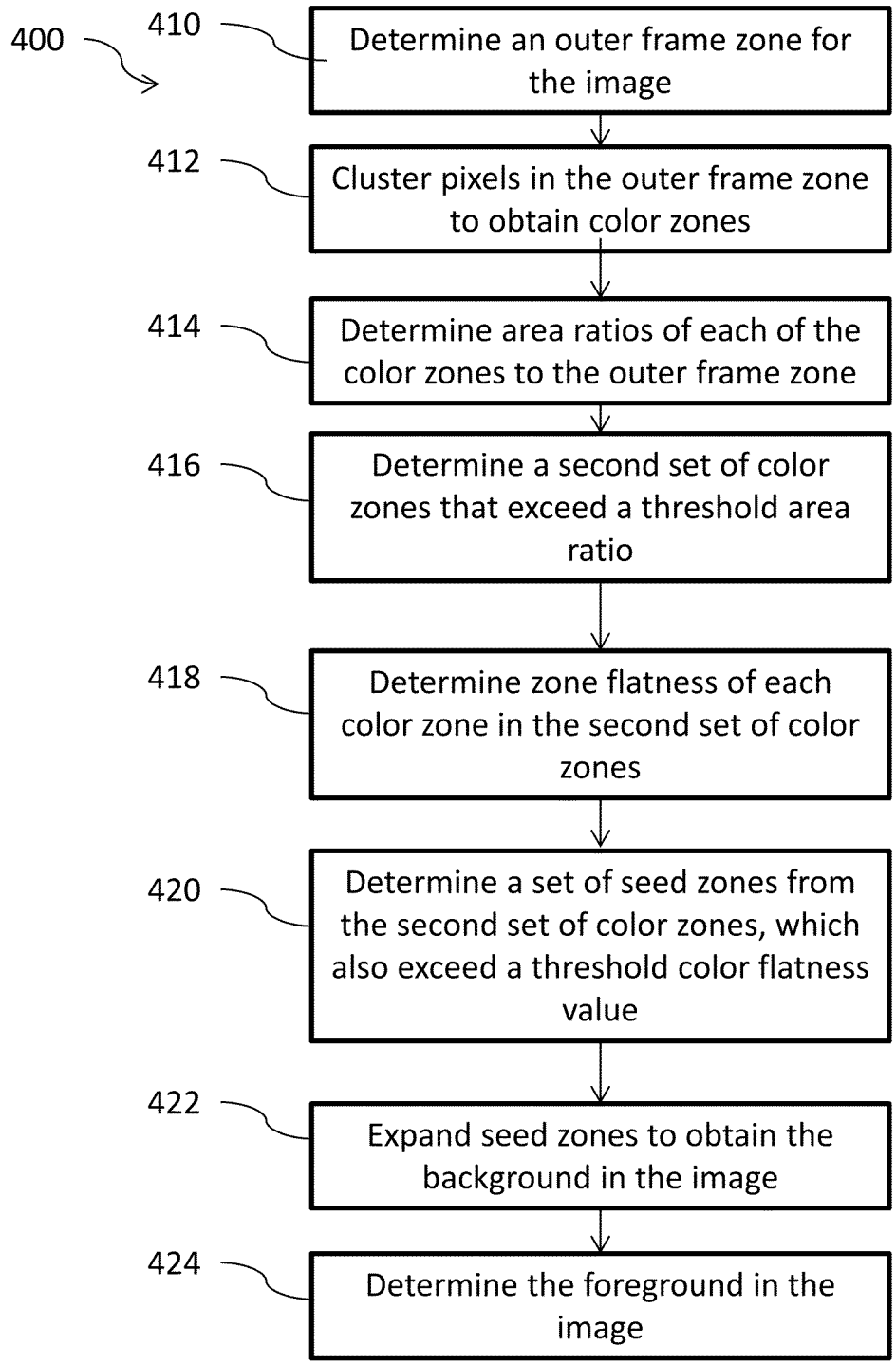
FIG. 4 is a flowchart illustrating an embodiment of determining the foreground and background in an image.

FIG. 4 is a flowchart illustrating an embodiment of determining the foreground and background in an image. In some embodiments, 400 is used to implement 321 in FIG. 3B.

At 410, an outer frame zone for the image is determined. The image is the image to be analyzed for quality. In some embodiments, the outer frame zone is determined by taking a predetermined boundary zone from each edge of the image on all sides of the image. For example, an area ratio of 20% of the target image is taken from all edges of the image as the outer frame zone. It is assumed that for most pictures, and particularly product images that the foreground or the product is located in the center of the image. In some embodiments, a predetermined distance from the edge of the image is taken as the outer frame zone.

Generally, the image contained within an outer frame zone is primarily the image formed from a background, and the background part of an image is generally more monochromatic, which is to say the zone has higher degree of flatness. Thus, through subsequent steps taken with respect to the outer frame zone, it is possible to determine the primary color of the background zone of the entire image and the seed zones of the background zone and, through the expansion of the seed zones, finally to obtain an entire background zone. That is, it is possible to determine the background zone and the foreground zone.

At 412, pixels in the outer frame zone are clustered to obtain a predetermined number (n1) of color zones. In some embodiments, pixels are categorized into color types (e.g., according to the pixel's RGB value), and then clustered into color zones by iteratively determining color-based distances (i.e. Euclidian distances measured using RGB color values) between the medium value (or average value) of two different color types, and grouping color types together if the color-based distance between two color types is the less than a predetermined threshold. The clustering process starts with individual pixels that have been classified by color types (such that pixels of the same value belong to the same color type), and clustering continues until color zones are formed such that within the outer frame zone the maximum color distance of pixels between two different color zones or color types is larger than or equal to a threshold. Several color regions that are non-contiguous can belong to the same color zone.

At 414, area ratios of each of the color zones to the outer frame zone are determined. The area of each of the color zones is divided by the area of the outer frame zone that was determined at 410 to obtain the area ratio of a color zone.

At 416, a second plurality of color zones that exceed a threshold area ratio value is determined. In some embodiments, the threshold area ratio value is predetermined. Then a second plurality of color zones that exceed the predetermined threshold area ratio value is determined from the color zones of the outer frame zone. In some embodiments, the number of color zones in the second plurality of color zones is denoted as n2.

At 418, color flatness value of each color zone in the second plurality of color zones is determined. The variance of the color zone (i.e. a measure of the differences of the color values) is used as a measure of the color flatness.

At 420, a set of seed zones is determined from the second plurality of color zones, where the color flatness of the each seed zone exceeds a threshold color flatness value. The number of such seed zones is denoted as n3. In some embodiments, the determined set of seed zones comprises the color zones that have highest flatness and the highest area ratios compared to the outer frame zone. The set of seed zones is deemed to be representative of the color zones in the background (i.e. not just including the outer frame zone).

At 422, the seed zones are expanded to obtain the background in the image. In some embodiments, expanding a seed zone includes determining whether the adjacent pixel has a color-based Euclidean distance less than a predetermined distance. In some embodiments, the predetermined distance is a multiple of the standard deviation of the image. In the event that the adjacent pixel to the seed zone is less than the predetermined distance, the adjacent pixel is added into the seed zone. The process is repeated and adjacent pixels are added to the seed zone until the color-based Euclidean distance between the seed zone and the pixels of an adjacent seed zone is greater than the predetermined distance. In some embodiments, the predetermined distance is a multiple of the image standard deviation that ranges from 0 to 1. For example, the predetermined distance of the color-based Euclidean distance is 0.5 image standard deviations.

In some embodiments, adjacent pixels are added to the seed zones from the background (i.e. greater than the outer frame zone as determined at 410). The whole background is obtained after growing the seed zones from the outer frame zone. The more complex an image is, the higher the image standard of deviation is, and the greater will be the growth of the seed zones.

At 424, the foreground in the image is determined. In some embodiments, the foreground is the part of the image that is not included in the background that was determined at 420.

Figure 5:
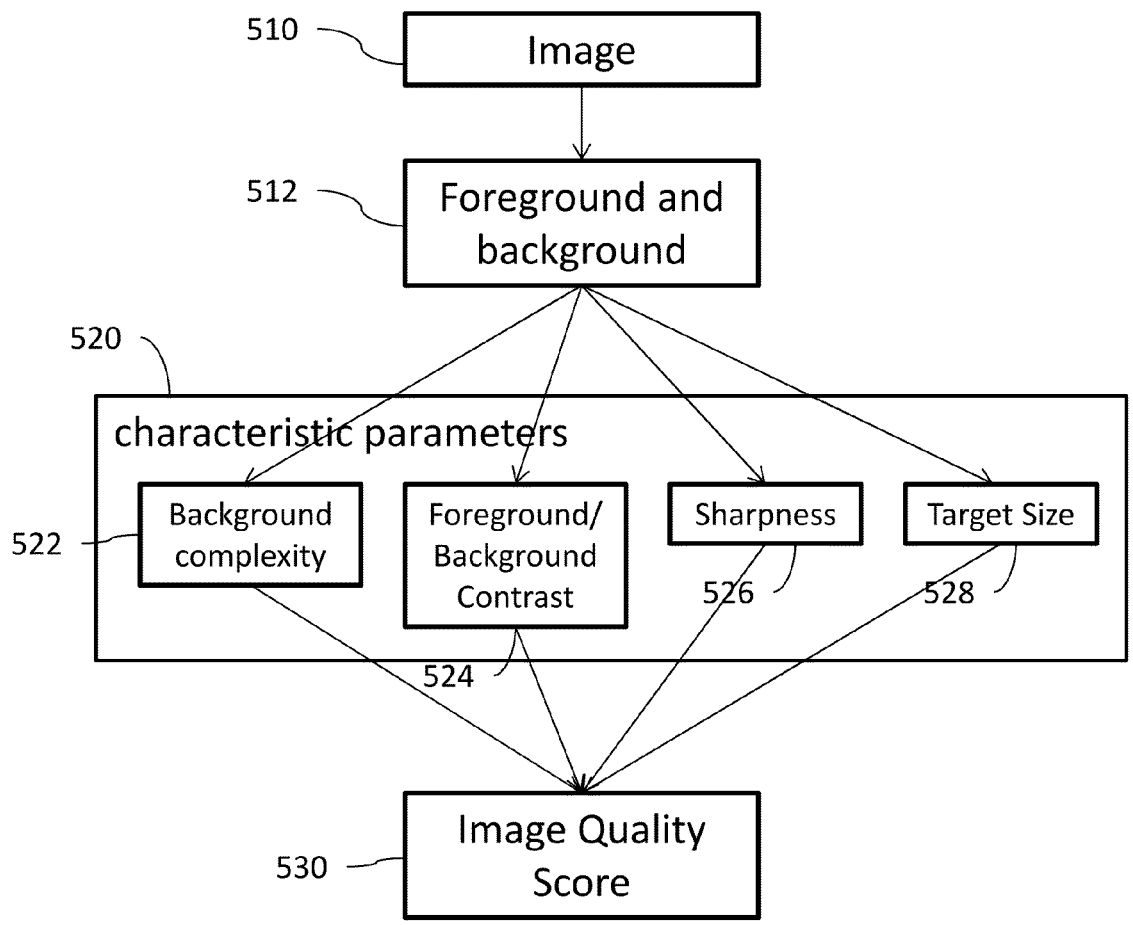
FIG. 5 is a block diagram illustrating an embodiment of the data used or determined in the analysis of image quality.

FIG. 5 is a block diagram illustrating an embodiment of the data used or determined in the analysis of image quality. From image 510, foreground and background 512 is determined by 400 in FIG. 4, then characteristic parameters 520 are determined and image quality score is determined based at least in part on the characteristic parameters (e.g., 324 in FIG. 3B).

Image 510 is an image to be analyzed for image quality. Foreground and background 512 are determined from image 510. Characteristic parameters 520 including one or more of the following: background complexity, foreground/background contrast, sharpness, and target size is determined using image 510 and the determined foreground and background (e.g. 512).

In some embodiments, one of the characteristic parameters comprises background complexity 522. Background complexity is used to express the disorder of the background in the image. In some embodiments, background complexity comprises a mean gradient value of the background. The higher the mean gradient, the more complex the background is. In some embodiments, background complexity is calculated by:

1. Applying the Sobel operator to the background of the image to obtain a gradient magnitude graph G;
2. Summing the gradient magnitude graph to obtain a total gradient magnitude, Sg;
3. Dividing the total gradient magnitude by the number of pixels, Pn to obtain the mean gradient, T, which represents background complexity of the image.

The formula is described as follows:

T=Sg/Pn, where T is the mean gradient value, Sg is the total gradient magnitude, and Pn is the number of pixels.

In some embodiments, the Sobel operator is applied to the whole image and not just the background, but only the pixels in the region of the background are summed and are counted in the background complexity, T.

In some embodiments, one of the characteristic parameters comprises foreground-background contrast 524. Foreground-background contrast 524 is used to reflect the strength of contrast of the foreground compared to the background.

In some embodiments, the method of calculating foreground-background contrast 524 comprises:

1. Determining foreground color zones and calculating area ratios between the area of each foreground color zone and the area of the foreground.

In some embodiments, determining the foreground color zones comprises clustering the pixels in the determined foreground to obtain n number of color types. In some embodiments, the method of clustering pixels is similar to the method for determining the background in 400 of FIG. 4.

In some embodiments, calculating the area ratios, Ai, between the area of each foreground color zone and the area of the foreground comprises determining the area of each foreground color zone and dividing by the area of the foreground (where i is an index from 1 to n, the number of color types in the foreground or number of color zones). In some embodiments, foreground color zones of the same color are counted together and their areas are added together in the area ratio. In some embodiments, each foreground color zone is counted separately regardless of color type.

2. Determining background color zones and calculating an area ratio between the area of each background color zone and the area of the foreground.

In some embodiments, determining the background color zones comprises clustering the pixels in the determined background to obtain m number of color types. In some embodiments, clustering of pixels in the background is similar to the clustering done 400 of FIG. 4. In some embodiments, the color zones determined in 412 of FIG. 4 are used as the background color zones and the number of color zones determined in 412 of FIG. 4 is m, the number of color types. In some embodiments, the pixels in the background are clustered into a different number of color zones than when determining the background in 400 of FIG. 4, so m is can also be the number of color zones.

In some embodiments, calculating the area ratios, Dj, of each background color zone and the area of the foreground comprises determining the area of each background color zone and dividing by the area of the foreground (where j is an index from 1 to m, the number of color types in the background or the number of color zones). In some embodiments, background color zones of the same color type (e.g. greens and light green) are counted as the same color zone and their areas are added together when calculating the area ratio.

3. Calculating a Euclidean color-based distance, Lij, between each foreground color zone and each background color zone. In some embodiments, the Euclidean color-based distance is the distance between the colors of the two color zones on a color scale (e.g. RGB, CYM, Hue/Saturation/Lightness, Hue/Saturation/Brightness).

4. Determining the foreground-background contrast, M, based on the Euclidean color-based distance and the area ratios, Ai (i.e. area ratio of the foreground color zones to the foreground area) and Dj (i.e. area ratio of the background color zones to the foreground area).

The formula is described as follows:

$$M = \sum_{i=1;j=1}^{n,m} LijAiDj \qquad (1)$$

Where, M is the foreground-background contrast; Lij is the Euclidean color-based distance between each foreground color zone and each background color zone; Ai is the area ratio of the foreground color zones to the area of the foreground; i is the index from 1 to n, the number of color zones or color types in the foreground; Dj is the area ratio of the background color zones to the area of the foreground; and j is the index from 1 to m, the number of color zones or color types in the background.

In some embodiments, one of the characteristic parameters comprises sharpness 526. Sharpness 526 is a measure of the spatial resolution of the image. In some embodiments, sharpness is determined by:

1. Dividing the foreground of pixel values, Ri, into blocks of a predetermined size. In some embodiments, the predetermined size has a length and width of N (e.g. a block of N*N), and M is the total number of blocks in the image and i is an index from 1 to M. In some embodiments, N is proportional to the size of the image. If the image is large, then N is chosen to be large. If the image is small, then N is also chosen to be small.

2. Performing a discrete-cosine-transform (DCT) on the pixel values, Ri, of each block to obtain a DCT coefficient matrix, Ci, for each block (where i is an index from 1 to M, where M is the total number of blocks in the image).

3. Creating a histogram matrix, H, based on the DCT coefficient matrix, Ci, for the blocks in the image. The formula for determining the value of each index of the array, H, is:

$$H_k = \sum_{k=1}^{N^2} C_i(k), \qquad (2)$$

$$(C_i(k) > DCT_{min})$$

Where, i is the index from 1 to M, the number of blocks in the image; Ci (k) is the value of the $k^{th}$ element in the DCT coefficient matrix Ci of the ith block; N is the size of the block; and $DCT_{min}$ is a preset threshold value.

The histogram matrix H, is an array which has N*N elements, and the value of each element is calculated using equation 2, where only DCT coefficients $C_i(k)$ of a block which are greater than the predetermined $DCT_{min}$ are summed into the Hk.

4. Calculate sharpness of the foreground using a weighting matrix W and the histogram of each block. The formula is:

$$S = \sum_{k=1}^{N^2} W(k), \quad (3)$$

$$(H_k > V_{max} * H_0)$$

Where, $V_{max}$ is the predetermined threshold value. W(k) and Hk are related by the index k. The inequality in the equation 3 is also a condition. For the kth element that meets the condition, H(k)>Vmax*H0, the corresponding W(k) is added to S. S is the sharpness, which is a sum of the W(k) elements that meet the condition, H(k)>Vmax*H0.

The number of rows and columns in the weighting matrix W is related to the value of N, the size of the block. For example, if N=8, an example 8*8 weighting matrix W is as shown in Table 1:

TABLE 1

| 8 | 7 | 6 | 5 | 4 | 3 | 2 | 1 |
|---|---|---|---|---|---|---|---|
| 7 | 8 | 7 | 6 | 5 | 4 | 3 | 2 |
| 6 | 7 | 8 | 7 | 6 | 5 | 4 | 3 |
| 5 | 6 | 7 | 8 | 7 | 6 | 5 | 4 |
| 4 | 5 | 6 | 7 | 8 | 7 | 6 | 5 |
| 3 | 4 | 5 | 6 | 7 | 8 | 7 | 6 |
| 2 | 3 | 4 | 5 | 6 | 7 | 8 | 7 |
| 1 | 2 | 3 | 4 | 5 | 6 | 7 | 8 |

In some embodiments, one of the characteristic parameters comprises foreground size 528. Foreground size 528 is used to reflect the ratio of the foreground to the overall image. In some embodiments, foreground size 528 is expressed as an area ratio of the foreground area to the area of the image. In some embodiments, the foreground size is expressed as a foreground length and width. In some embodiments, the foreground length and width is the length and width of a minimum enclosing rectangle around the foreground.

Once the characteristic parameters of the image are determined, they are entered into the pre-trained quality computation model to compute the quality score for the image, which is used by processes such as 300 to aid in the ranking and filtering of search results.

Figure 6:
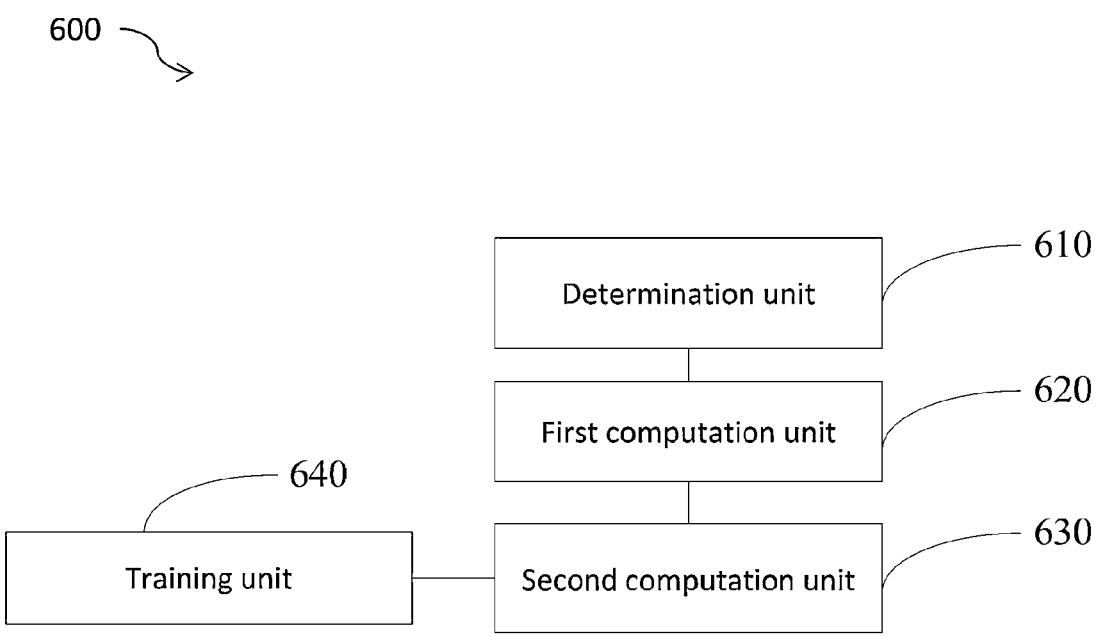
FIG. 6 is a block diagram illustrating an embodiment of an image quality analysis system that corresponds to the image quality analysis method described above.

FIG. 6 is a block diagram illustrating an embodiment of an image quality analysis system that corresponds to the image quality analysis method described above. The system comprises: a determination unit 410, configured to determine the target zone and background zone of an image; a first computation unit 420, configured to calculate characteristic parameters based on said target zone and/or background zone; a second computation unit 430, configured to take calculated characteristic parameters as input values for a preset quality computation model and calculating the image quality analysis results corresponding to said characteristic parameters.

Figure 7:
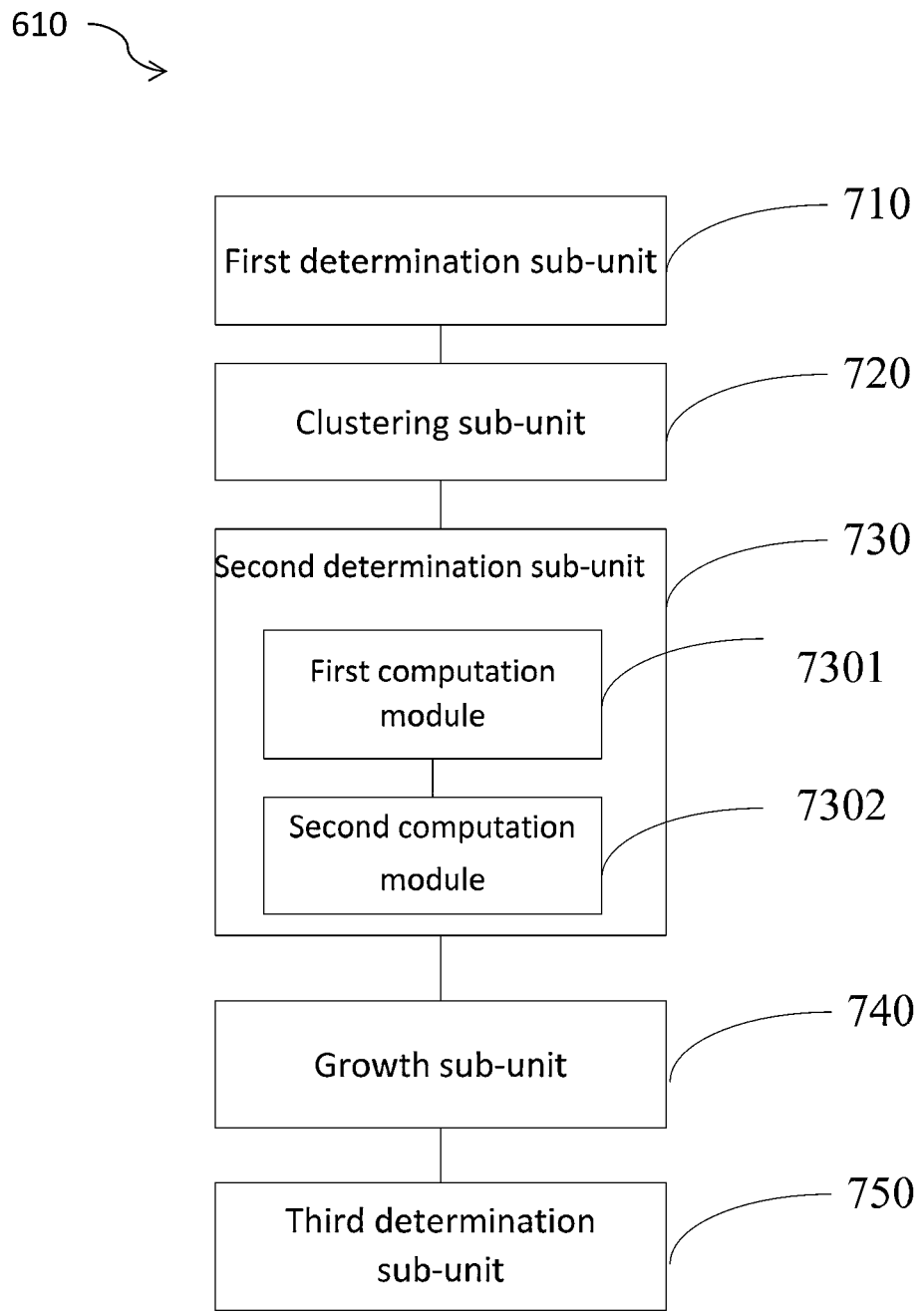
FIG. 7 is a block diagram illustrating an embodiment of a determination unit 610 of system 600.

FIG. 7 is a block diagram illustrating an embodiment of a determination unit 610 of system 600. As shown, unit 610 includes: a first determination sub-unit 510, configured to determine an outer frame zone of a preset area ratio of the image; a clustering unit 520, configured to perform clustering on the outer frame zone to obtain color zones of preset n1 color types; a second determination sub-unit 530, configured to determine, according to the color zones of said n1 color types, the seed zones of the background zone; a growth sub-unit 540, configured to take a seed zone as the center and, when the color-based Euclidean distance between each pixel adjacent to the seed zone and pixels in the adjacent seed zone is confirmed not to be greater than a preset multiple of the image standard deviation, add the pixels into the seed zone until the color-based Euclidean distance between all the pixels adjacent to the seed zone and pixels in the adjacent seed zone is greater than a preset multiple of the image standard deviation; a third determination sub-unit 550, configured to take all seed zones as the background zone of the image, and the zone other than all the seed zones as the image target zone.

Preferably, as shown in FIG. 7, the second determination sub-unit 730 comprises: a first computation sub-module 5301, configured to calculate the area ratio of each color zone of n1 color types to the outer frame zone, and selecting color zones of n2 color types whose area ratio exceeds a ratio threshold value; a second computation sub-module 5302, configured to calculate the zone flatness of each color zone of n2 color types, select color zones of n3 color types whose flatness exceeds a flatness threshold value, and take the color zones of n3 color types as the seed zones. Here n1≥n2≥n3, and n2 and n3 being natural numbers.

In some embodiments, the characteristic parameters of the image comprises one or more of: background complexity, foreground-background contrast, total resolution, and product size.

The first computation unit 620 comprises: a first computation sub-unit, configured to extract the mean gradient value from the background zone according to said background zone and take this mean gradient value as a numerical value for background complexity.

In some embodiments, the first computation sub-unit uses a Sobel operator to obtain the gradient magnitude graph G for the image, uses the gradient magnitude graph G to figure the background zone gradient magnitude total and Sg and the number of pixels Pn in the background zone, and uses gradient magnitude total Sg and the number of pixels Pn to calculate the mean gradient T for the background zone. The formula is as follows: T=Sg/Pn.

The first computation unit 620 further comprises a second computation unit that performs clustering to target zones to obtain preset n types of color zones and calculates the ratio Ai of each type of color zone to the target zone, i being greater than or equal to 1 and less than or equal to n. The second computation unit also subjects the background zone to clustering treatment to obtain preset m types of color zones and calculating the ratio Dj of each type of color zone to the target zone, j being greater than or equal to 1 and less than or equal to m. It further calculates the Euclidean distance Lij between each type of color in the target zone and each type of color in the background zone, and uses the Euclidean distances between the colors and the color ratios to calculate said foreground-background contrast, $$M = \sum_{i=1; j=1}^{n,m} L_{ij} A_i D_j;$$

The first computation unit 620 further comprises a third computation sub-unit that: divides the target zone into image blocks of a preset size and performing DCT conversion on the pixel values of each image block to obtain DCT coefficient matrices for the image blocks; creates, based on the DCT coefficient matrix for each image block, histograms corresponding to the image blocks; calculates, based on the histogram of each image block and a weighting matrix, the total resolution of the target zone.

The first computation unit 620 further comprises a fourth computation sub-unit that: determines the area of the target zone and the total area of the entire image zone; calculates the area ratio of the target zone to the image zone; and/or calculates the minimum enclosing rectangle in the target zone and obtaining the length and width of the rectangle.

Preferably, as shown in FIG. 6, system 600 further comprises: a training unit 440 that: selects a certain quantity of images as training samples, extracts characteristic parameters from each of said images, and presets the image quality analysis results of each image; conducts training based on the characteristic parameters of said images and on the image quality analysis results, trains up an SVM-fitted model which uses image characteristic parameters as input and image quality analysis results as output, and uses the SVM-fitted model as said preset quality computation model.

In the image quality analysis system shown in FIGS. 6 and 7, the determination unit determines the target zone and the background zone in the image; the first computation unit calculates the characteristic parameters of the image based on said target zone and/or background zone; the second computation unit inputs the calculated characteristic parameters into the preset quality computation model to obtain image quality analysis results corresponding to said characteristic parameters. In this way, quality analysis of the image is realized.

The image quality analysis method and system of the present application embodiments can be applied to more than just the network system shown in FIG. 1. It can also be applied to image quality analysis in other environments, e.g., a client installed directly at a merchant venue for providing the merchant with quality analysis of product images.

Therefore, the product image quality analysis results obtained using the product image quality analysis method in the present application embodiments described above can be applied to the product search process of a website server. They can serve as a basis for further screening of product search results when a website server conducts a product search. The above is merely one example of a product search. The technique is applicable to other forms of target image searches. In some embodiments, after image quality analysis results are computed, a website server receives a user search request, conducts a target search based on target characteristic information carried in the search request, and obtains target search results. The web server further assesses in succession whether the image quality analysis result of each target among the target search results is greater than a preset analysis result threshold value; if not greater, the information corresponding to the target is removed from the list of search results and not displayed to the user; if greater, then the information corresponding to the product is maintained in the list of search results and can be displayed in the user.

In some embodiments, instead of screening search results, the website server replaces said assessing step with the following: ranking the target search results based on the image quality analysis results of each target and displaying the ranked search results to the user.

In some embodiments, a target corresponds to multiple target images. In such a situation, the image quality analysis results for a target can be calculated based on the quality analysis results for images corresponding to the target. For example, a mean or average quality score might be calculated.

In some embodiments, system 600 or 700 further comprises a search unit that receives a user search request, conducts a target search based on target characteristic information carried in the search request, and obtains target search results; a third computation unit that calculates, based on the quality analysis results of each image corresponding to a target, the image quality analysis results corresponding to the target; an assessing unit, that assesses in succession whether the image quality analysis result of each target among the target search results is greater than a preset analysis result threshold value; if not greater, deletes the information corresponding to the target from the target search results; if greater, retains in the target search results the target information.

In some embodiments, system 600 or 700 further comprises a search unit that receives a user search request, conducts a target search based on target characteristic information carried in the search request, and obtains target search results.

In some embodiments, system 600 or 700 further comprises a third computation unit that calculates based on the quality analysis results of each image corresponding to a target, the image quality analysis results corresponding to the target.

In some embodiments, system 600 or 700 further comprises a ranking unit that ranks the target search results based on the image quality analysis results of the target.

The units and/or modules described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

In application examples of the image quality analysis method and system in embodiments of the present application, the website server, when conducting target searches, screens or ranks target search results according to target image quality analysis results. The results will have better image quality for all the targets browsed by the user or for the first targets first browsed by the user. This approach reduces the frequency with which users browse targets that have inferior image quality. It thereby reduces the transmission bandwidth used up by the client and the website server and thus conserves network transmission resources. Moreover, the number of interactions between clients and website servers will be reduced, as will the data processing burdens on website servers. It will increase the data processing speed and efficiency of website servers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   determining, using one or more processors, an image quality score associated with an image, including:
   determining a foreground and a background in the image, comprising:
   determining an outer frame zone of the image, wherein the outer frame zone is determined using a preset value from edges of the image;
   clustering pixels in the outer frame zone to obtain a plurality of color zones, wherein each color zone corresponds to a color type;
   determining seed zones;
   expanding the seed zones to obtain the background in the image; and
   determining the foreground;
   calculating a set of one or more characteristic parameters of the image based on the foreground and the background, wherein the characteristic parameters comprise a foreground-background contrast, and wherein the foreground-background contrast is determined by:
   determining foreground color zones of the foreground and calculating an area ratio between an area of a foreground color zone and an area of the foreground;
   determining background color zones and calculating an area ratio between an area of a background color zone and the area of the foreground;
   calculating a Euclidean color-based distance between the foreground color zone and the background color zone; and
   determining the foreground-background contrast based at least in part on the Euclidean color-based distance and the area ratios; and
   calculating the image quality score based at least in part on the set of characteristic parameters, wherein calculating the image quality score comprises using an image quality computation model that has been pre-trained; and
   in response to a search query, generating a set of search results that includes a set of images, wherein inclusion of the images or ranking of the search results is based at least in part on image quality scores associated with the set of images.

2. The method of claim 1, wherein expanding the seed zones comprises:
   starting from a seed zone as the center, determining whether an adjacent pixel to the seed zone has a color-based Euclidean distance less than a predetermined distance;
   in the event that the adjacent pixel is less than a predetermined distance, adding the adjacent pixel into the seed zone;
   repeating adding adjacent pixels to the seed zone, based on the color-based Euclidean distance, until the color-based Euclidean distance between the seed zone and the pixels of an adjacent seed zone is greater than or equal to the predetermined distance.

3. The method of claim 1, wherein the characteristic parameters comprise a background complexity, wherein background complexity comprises a mean gradient value of the background.

4. The method of claim 1, wherein the foreground-background contrast is calculated using the formula:

$$M = \sum_{i=1;j=1}^{n,m} L_{ij} A_i D_j,$$

wherein M is the foreground-background contrast, $L_{ij}$ is a Euclidean color-based distance between a foreground color zone i and each background color zone j, $A_i$ is the area ratio of the foreground color zones to the area of the foreground and $D_j$ is the area ratio of the background color zones to the area of the foreground.

5. The method of claim 1, wherein the characteristic parameters comprise sharpness, and the sharpness is determined by:
   dividing the foreground into blocks of a predetermined size;
   performing a discrete-cosine-transform (DCT) on the pixel values of each block to obtain DCT coefficient matrices for each block;
   creating histograms for each block based on the DCT coefficient matrix for each block;
   calculating sharpness of the foreground based on the histogram of each block and a weighting matrix.

6. The method of claim 1, wherein the characteristic parameters comprise a foreground size.

7. The method of claim 6, wherein the foreground size is determined by:
   determining the area of the foreground and the total area of the image; and
   calculating the area ratio of the foreground to the area of the image.

8. The method of claim 6, wherein the foreground size is determined by:
   determining a minimum enclosing rectangle of the foreground; and
   determining a length and a width of the minimum enclosing rectangle.

9. The method of claim 1, wherein the image quality computation model includes a support-vector-machine (SVM).

10. The method of claim 9, wherein the image quality computation model has been trained by:
    selecting a plurality of training images;
    extracting characteristic parameters from the training images;
    setting corresponding image quality scores for the training images; and
    training the support-vector-machine using the extracted characteristic parameters of the training images and the corresponding image quality scores, such that a new image with similar extracted characteristic parameters to a training image, when inputted into the image quality computation model, will result in a similar image quality score as the training image.

11. The method of claim 1, wherein the image quality score for the image is calculated before the search query is received.

12. The method of claim 1, wherein the clustering of the pixels in the outer frame zone comprises:
    categorizing the pixels into color types;
    determining a distance between two color types based on RGB values of two corresponding pixels; and
    grouping the two color types together in the event that the distance between the two color types is less than a predetermined threshold.

13. A system comprising:
a one or more processors to:
- determine an image quality score associated with an image, including to:
  - determine a foreground and a background in the image, comprising:
    - determine an outer frame zone of the image, wherein the outer frame zone is determined using a preset value from edges of the image;
    - cluster pixels in the outer frame zone to obtain a plurality of color zones, wherein each color zone corresponding to a color type;
    - determine seed zones;
    - expand the seed zones to obtain the background in the image; and
    - determine the foreground;
  - calculate a set of one or more characteristic parameters of the image based on the foreground and the background, wherein the characteristic parameters comprise a foreground-background contrast, and wherein the foreground-background contrast is determined by:
    - determine foreground color zones of the foreground and calculating an area ratio between an area of a foreground color zone and an area of the foreground;
    - determine background color zones and calculating an area ratio between an area of a background color zone and the area of the foreground;
    - calculate a Euclidean color-based distance between the foreground color zone and the background color zone; and
    - determine the foreground-background contrast based at least in part on the Euclidean color-based distance and the area ratios;
  - calculate the image quality score based at least in part on the set of characteristic parameters, wherein calculating the image quality score comprises using an image quality computation model that has been pre-trained; and
  - in response to a search query, generate a set of search results that includes a set of images, wherein inclusion of the images or ranking of the search results is based at least in part on image quality scores associated with the set of images; and
- a memory coupled to the one or more processors and configured to provide the one or more processors with instructions.

14. A computer program product being embodied in a tangible non-transitory computer readable storage medium and comprising computer instructions for:
- determining, using one or more processors, an image quality score associated with an image, including:
  - determining a foreground and a background in the image, comprising:
    - determining an outer frame zone of the image, wherein the outer frame zone is determined using a preset value from edges of the image;
    - clustering pixels in the outer frame zone to obtain a plurality of color zones, each color zone corresponding to a color type;
    - determining seed zones;
    - expanding the seed zones to obtain the background in the image; and
    - determining the foreground;
  - calculating a set of one or more characteristic parameters of the image based on the foreground and the background, wherein the characteristic parameters comprise a foreground-background contrast, and wherein the foreground-background contrast is determined by:
    - determining foreground color zones of the foreground and calculating an area ratio between an area of a foreground color zone and an area of the foreground;
    - determining background color zones and calculating an area ratio between an area of a background color zone and the area of the foreground;
    - calculating a Euclidean color-based distance between the foreground color zone and the background color zone; and
    - determining the foreground-background contrast based at least in part on the Euclidean color-based distance and the area ratios;
  - calculating the image quality score based at least in part on the set of characteristic parameters, wherein calculating the image quality score comprises using an image quality computation model that has been pre-trained; and
  - in response to a search query, generating a set of search results that includes a set of images, wherein inclusion of the images or ranking of the search results is based at least in part on image quality scores associated with the set of images.

* * * * *